UNITED STATES PATENT OFFICE.

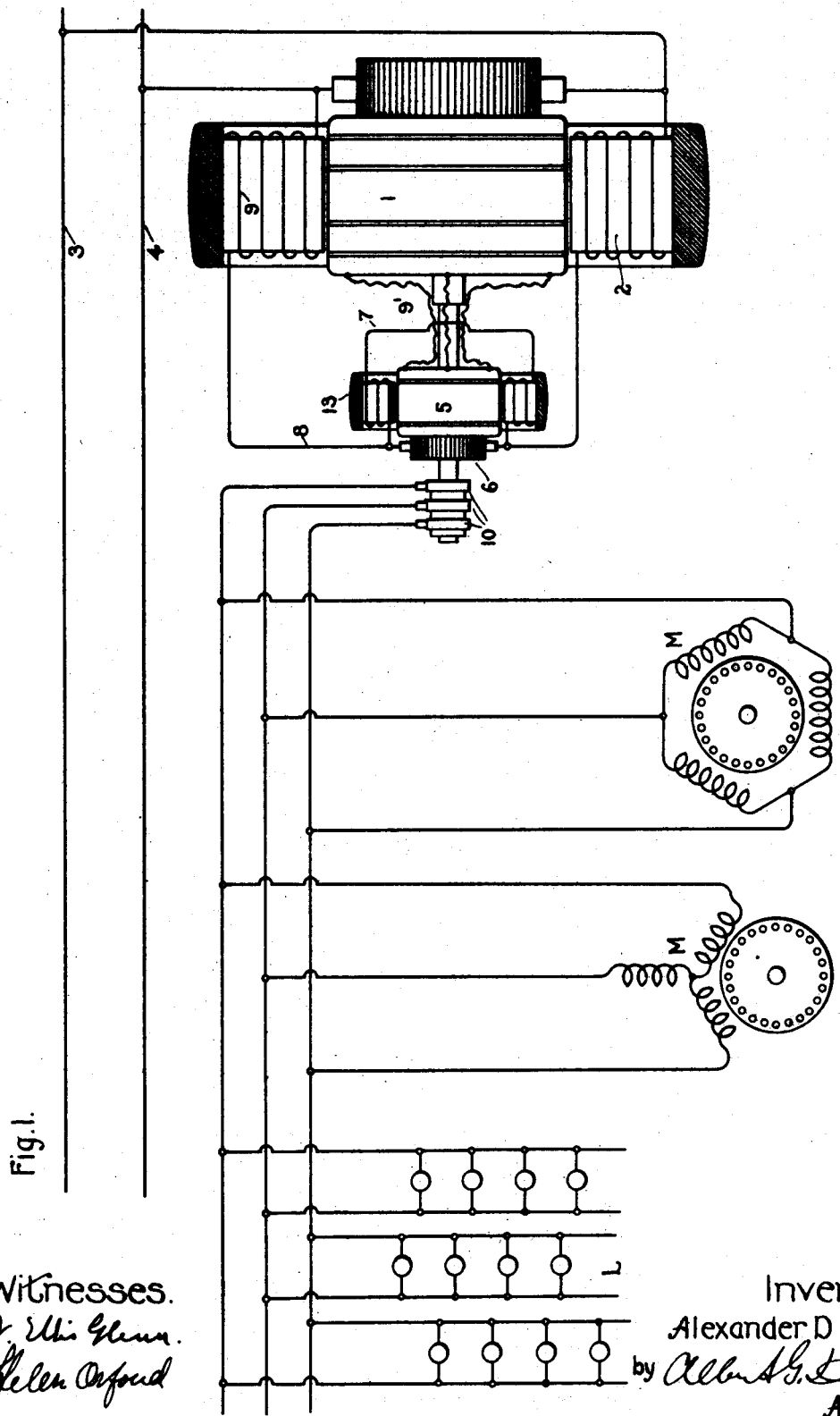

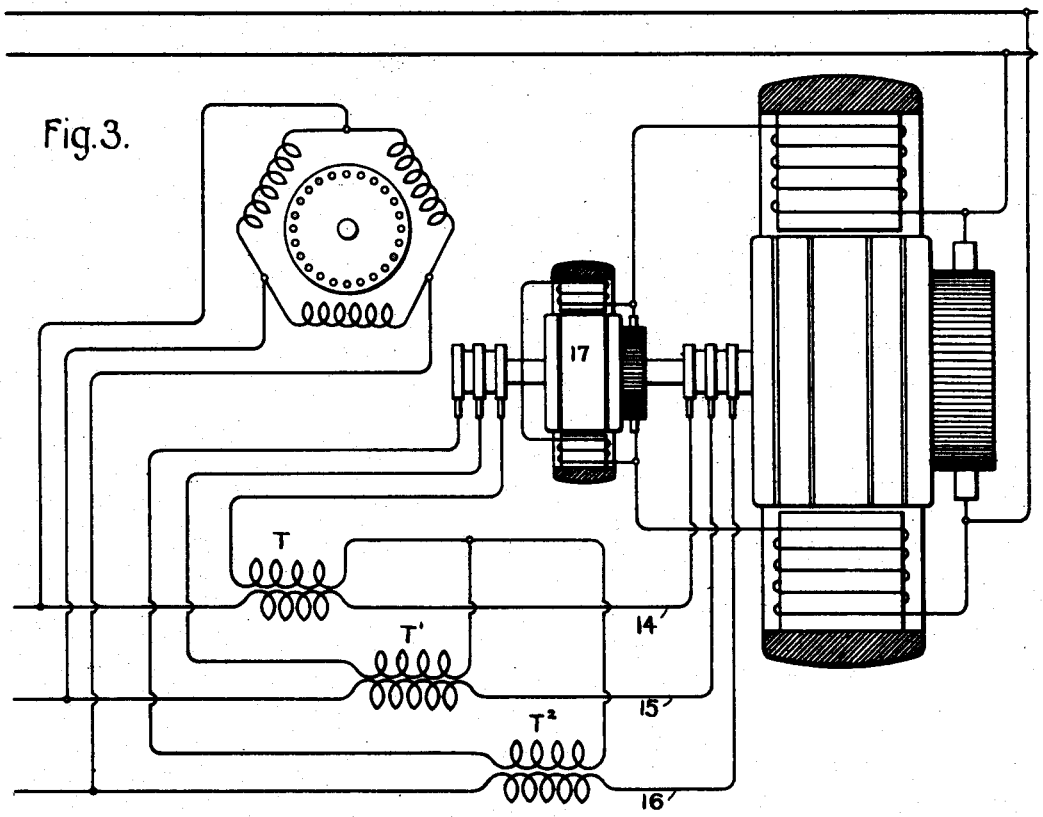
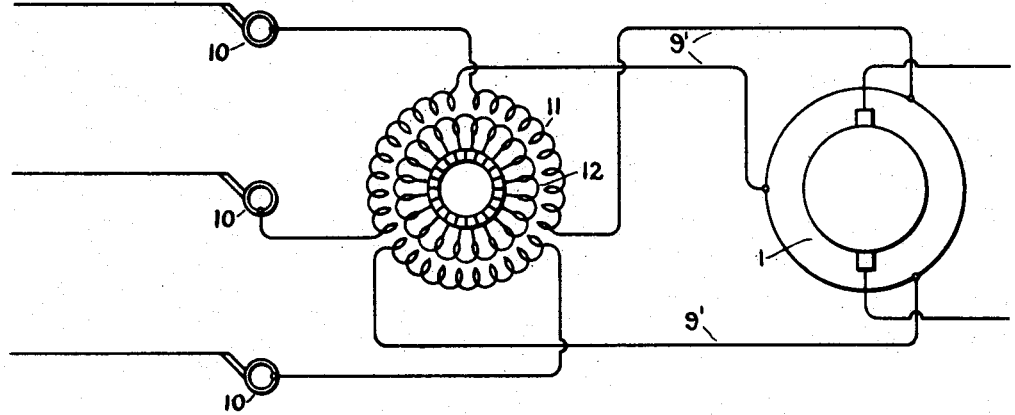

ALEXANDER D. LUNT, OF SCHENECTADY, NEW YORK, ASSIGNOR TO GENERAL ELECTRIC COMPANY, A CORPORATION OF NEW YORK.

REGULATING DYNAMO-ELECTRIC MACHINES.

SPECIFICATION forming part of Letters Patent No. 713,010, dated November 4, 1902.

Original application filed January 7, 1900, Serial No. 1,727. Divided and this application filed March 31, 1902. Serial No. 100,658. (No model.)

*To all whom it may concern:*

Be it known that I, ALEXANDER D. LUNT, a citizen of the United States, residing at Schenectady, county of Schenectady, State of New York, have invented certain new and useful Improvements in Regulating Dynamo-Electric Machines, (Case No. 2,805, division of my prior application, Serial No. 1,727, filed January 7, 1900,) of which the following is a specification.

When an ordinary rotary converter is inverted in function, whereby it receives energy in the form of direct current and delivers alternating current, its speed is dependent upon its field strength, except in the case where the converter is coupled in multiple with a constant-speed alternator or other source of alternating current of steady frequency. If without being connected to a source of alternating current of steady frequency the converter is used to supply alternating-current-translating devices, its speed is subject to wide variations, due to the effect of the reaction of wattless current in the armature upon the field strength of the machine. If, for example, the converter supplies a load which takes a considerable lagging current, then the demagnetizing effect of this current upon the field of the converter may be such as to cause a dangerous increase in speed. To overcome this difficulty and prevent any mishaps which might arise from dangerously-high speed in the converter, many devices have been proposed. So far as I am aware, however, all of these devices require the speed of the converter to increase above the normal before they are brought into operation and their useful effects obtained.

My present invention aims to compensate for the armature reaction of the alternating current supplied by the converter, and in its operation anticipates the variation in speed which otherwise would result from a change in field strength.

The nature of my invention and its mode of operation will be better understood by reference to the following description, taken in connection with the accompanying drawings, while its scope will be particularly pointed out in the claims appended hereto.

Figure 1 illustrates an apparatus embodying my invention. Fig. 2 is a partial diagram of circuits of the apparatus shown in Fig. 1, and Fig. 3 is a modification.

As briefly mentioned above, the variations in speed of such inverted rotary converters are principally due to the varying reaction of wattless armature-currents upon the field strength. The most effective regulation in speed is therefore that which employs means responsive directly to variations in the wattless component of the alternating load and not one which depends for its effectiveness upon variations in speed of the machine. The one is directly responsive to the cause of speed variation, while the other acts only after the speed commences to vary.

My invention consists, therefore, in the utilization of field-regulating means responsive directly to variations in the amount of leading or lagging current in the alternating-current circuit of the machine. Various means may be employed for securing this result, some of which I herein describe as illustrating my invention. That other apparatus may be employed for securing the beneficial effects of my invention will be obvious to those skilled in the art.

To secure the best effects, I prefer to employ a regulating dynamo-electric machine driven synchronously with the inverted rotary converter and operating to supply an electromotive force directly proportional to the amount of wattless alternating current in the main. The field of the converter may, if desired, be excited entirely from this source of electromotive force or by the resultant effect of this electromotive force and of current derived from some source of constant potential—such, for example, as the direct-current supply mains to which the inverted rotary is connected.

Fig. 1 shows an apparatus of this description. The armature of an inverted rotary converter is indicated at 1 and its field-magnet at 2. Direct current is supplied to the commutator of the machine from direct-current mains 3 4. Upon the same shaft with the armature 1 is mounted the armature 5 of a regulating-machine of the direct-current type. The armature of this machine is provided with two distinct windings and in structure resembles somewhat an ordinary motor-generator. One of the windings is connected to a commutator 6 and operates in the same manner as the generating-winding of a direct-current machine. Brushes bear upon the commutator 6 and are connected to the shunt field-winding 7 and to an external circuit 8. The circuit 8 is arranged so as to include the armature 5 of the regulating-machine in series with the field-winding 9 of the converter, which field-winding is supplied with current from the direct-current-supply mains 3 4. It will thus be seen that the electromotive force of the regulating-machine is combined with that impressed upon the converter field-winding from the direct-current mains.

In order to secure the necessary variation in the electromotive force of the regulating-machine in response to variation of power factor of the alternating-current load supplied by the inverted rotary converter, the regulating-machine is provided with a second winding arranged in series with the alternating leads brought out from the armature of the converter. These leads are shown in the drawings at 9'. They pass from the winding of the converter-armature 1 through the second winding on the regulating-machine and then to collector-rings 10, from which current is led off to suitable translating devices—such, for example, as lamps L, motors M, and the like. The arrangement of these circuits will best be understood by a brief reference to Fig. 2. Here the armature of the inverted rotary is indicated at 1. The alternating-current leads 9' are shown as proceeding therefrom and passing through the series winding 11 on the armature of the direct-current-regulating machine and then to the collector-rings 10, from which current is distributed to translating devices. The armature of the regulating-machine is provided with a second winding 12, this winding being connected to a commutator in the usual way and by its rotation serving to generate a continuous electromotive force.

When in operation, the winding 12 generates an electromotive force of approximately constant value so long as the amount of wattless current flowing in the winding 11 remains constant. When, however, the wattless current varies, its reaction upon the field of the regulating-machine alters the field strength, and consequently alters the electromotive force derived from the winding 12, thereby producing a corresponding change in the field-magnetization of the inverted converter. In explanation of this action it may be stated that the current flowing in the winding 11 produces a rotary field revolving with a frequency corresponding to the speed of the inverted rotary. The connections to the winding 11 are made in such a way as to cause the direction of rotation of the field to be opposite to the direction of rotation of the shaft. The shaft rotates in one direction as fast as the field rotates with respect to the shaft, and the field therefore becomes fixed in space. The field-magnet 13 is arranged so that the flux set up by this field causes merely a cross magnetization in the field-poles when the inverted converter is operating at unit power factor. If under these conditions the alternating current commences to lag, then the flux in the regulating-machine due thereto would rotate slightly in space and be brought partially into line with the field magnetization, thereby reducing the effective magnetic flux of the machine and so reducing its electromotive force. This reduction in the electromotive force of the regulating-machine causes an increase in the current flowing in the field-winding of the converter, since in this instance the regulating-machine is connected in opposition to the electromotive force impressed on the converter field-winding. The increase in speed of the converter which would ordinarily be caused by the weakening of its field due to the reaction of lagging currents in the armature is in this case compensated for by the increase in field ampere-turns, which takes place directly in response to variation in wattless current supplied by the converter. The field magnetomotive force is thus increased as soon as any opposition thereto is presented by the reaction of lagging armature-currents.

It will be understood that with leading currents the opposite effect takes place, the field magnetomotive force of the converter being decreased to compensate for the magnetizing effect of leading currents in the armature.

Although I have shown the regulating-machine as provided with a field structure 13 having an exciting-winding, I may, if desired, omit the exciting-winding and produce the requisite magnetization of the field entirely by the reaction of wattless currents in the armature. In this case the field magnetization will be zero at unit power factor and will increase from zero by an amount dependent upon the value of wattless current flowing. Since the field thus operates below saturation, its variation in strength will be almost exactly proportional to the variation in wattless current, and the electromotive force developed at the commutator of the machine will therefore correspond. If the alternating-current load is liable to change from lagging to leading or the reverse, I prefer to provide the field with a magnetizing-winding, as shown, and to vary the field strength above and below a certain selected point below the point of saturation. If no field-winding were employed, the effect of hysteresis upon changing from lagging to leading current or the reverse would cause the field magnetization for a given value of lagging current to be different from that corresponding to the same value of leading current, which is an undesirable result.

While I have shown the regulating-machine as employed merely for the purpose of varying the amount of current flowing in the field of the converter, it will be evident, as before stated, that this machine may be employed for supplying the total excitation, in which case the connection of the converter field with the direct-current mains 3 4 would be omitted.

Fig. 3 shows a somewhat-different arrangement of apparatus, the difference being that the regulating-machine in this case is provided with but a single winding, to which both commutator and collector-rings are connected. The collector-rings are supplied with electromotive forces derived from the secondaries of series transformers T T' T², whose primaries are connected in series with the alternating-current mains 14, 15, and 16. The connection of the collector-rings with the winding of the armature 17 is made so that the direction of the rotation of the field due to the alternating currents is opposite to the direction of rotation of the armature, whereby, as before, this field is caused to be stationary in space. As the wattless current in the alternating-current mains changes, the field strength of the regulating-machine is correspondingly changed in the manner above briefly described. In other respects the action of the arrangement shown in Fig. 3 is the same as that shown in Fig. 1, so that it is therefore unnecessary to refer again in detail to parts of the apparatus shown in Fig. 3, but not specifically mentioned.

In Figs. 1 and 3 the field-windings are arranged to produce certain polarities in the pole-pieces. This relation of polarities may be correct for a given number of poles and incorrect for another, and it is therefore to be understood that in carrying out the invention in practice the fields are to be wound in a direction suitable for producing the requisite relation of polarities in the field-poles. Thus, for example, if Fig. 3 were supposed to represent a machine having two poles, then the field-winding would be incorrectly shown, since the two poles would be of the same polarity. If, however, it be supposed that the arrangement represents a six-pole machine, the direction of the windings would be correct.

What I claim as new, and desire to secure by Letters Patent of the United States, is—

1. A system of distribution comprising a source of direct current, an inverted rotary converter receiving current therefrom and supplying alternating current to translating devices, a field-winding on said converter connected to said source of direct current, and means dependent on the power factor of said alternating current, for varying the amount of current in said winding.

2. A system of distribution comprising a source of direct current, an inverted rotary converter receiving current therefrom and supplying alternating current to translating devices, a field-winding on said converter connected to said source of direct current, and a synchronously-operated machine supplying a regulating electromotive force to said winding.

3. A system of electrical distribution comprising a source of direct current, an inverted rotary converter receiving current from said source and supplying alternating current to translating devices, and means responsive to the wattless component of said alternating current and operative irrespective of changes of frequency for controlling the mount of effective field ampere-turns.

4. The combination of a dynamo-electric machine delivering alternating current and running at a speed dependent upon its field-magnet strength, and means responsive to the wattless component of said alternating current for automatically varying the field excitation.

5. The combination of a dynamo-electric machine delivering alternating current of a frequency dependent upon the field-magnet strength of the machine, and means operative irrespective of changes of frequency for compensating for the magnetizing or demagnetizing effects of wattless current in the armature of the machine.

6. The combination of a dynamo-electric machine delivering alternating current of a frequency dependent upon the field-magnet strength of the machine, and means controlled by the wattless component of said alternating current and operative irrespective of changes of frequency, for governing the frequency of said current.

7. The combination of a dynamo-electric machine delivering alternating current of an electromotive force independent of the field strength of the machine, and means responsive to the wattless component of said alternating current for varying the magnetomotive force of the field.

In witness whereof I have hereunto set my hand this 29th day of March, 1902.

ALEXANDER D. LUNT.

Witnesses:
BENJAMIN B. HULL,
HELEN ORFORD.